United States Patent
Herremans et al.

(10) Patent No.: US 9,635,732 B2
(45) Date of Patent: Apr. 25, 2017

(54) DYNAMIC LIGHTING SYSTEM WITH A DAILY RHYTHM

(75) Inventors: Hannelore Marie Lea Elise Herremans, Vosselaar (BE); Lucas Josef Maria Schlangen, Eindhoven (NL); Leonie Maria Geerdinck, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 190 days.

(21) Appl. No.: 13/810,301

(22) PCT Filed: Jul. 7, 2011

(86) PCT No.: PCT/IB2011/053014
§ 371 (c)(1),
(2), (4) Date: Jan. 15, 2013

(87) PCT Pub. No.: WO2012/011008
PCT Pub. Date: Jan. 26, 2012

(65) Prior Publication Data
US 2013/0119891 A1    May 16, 2013

(30) Foreign Application Priority Data

Jul. 21, 2010 (EP) .................................... 10170256

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ......... *H05B 37/02* (2013.01); *H05B 33/0857* (2013.01); *H05B 37/0281* (2013.01); *Y02B 20/42* (2013.01)

(58) Field of Classification Search
CPC ... F21V 9/16; F21V 9/00; H01L 33/00; H05B 37/02; H05B 37/029; H05B 41/42; F21W 2131/406; G05B 19/14
USPC ................................... 315/293, 294
See application file for complete search history.

(56) References Cited

U.S. PATENT DOCUMENTS

| | | | |
|---|---|---|---|
| 5,589,741 A | 12/1996 | Terman et al. | |
| 6,554,439 B1 | 4/2003 | Teicher et al. | |
| 8,847,508 B2 * | 9/2014 | Huang ............... | H05B 37/0227 315/291 |

(Continued)

FOREIGN PATENT DOCUMENTS

| | | |
|---|---|---|
| CN | 101257750 A | 9/2008 |
| CN | 101884249 A | 11/2010 |

(Continued)

*Primary Examiner* — Lincoln Donovan
*Assistant Examiner* — Diana J Cheng (57) ABSTRACT

The invention provides a method for controlled lighting of an area (2) with a lighting system (1). The method comprises providing with the lighting system (1), according to a predetermined time program, general lighting (11) during a predetermined general lighting period and colored lighting (21) during a predetermined first colored lighting period. The time program runs for at least 6 hours. Further, in the method a control unit (30) is applied, configured to control the lighting system (1) according to the predetermined time program.

20 Claims, 4 Drawing Sheets

(56) References Cited

U.S. PATENT DOCUMENTS

| | | |
|---|---|---|
| 2007/0153514 A1 | 7/2007 | Dowling et al. |
| 2008/0079568 A1 | 4/2008 | Primous et al. |
| 2008/0186256 A1 | 8/2008 | Readler |
| 2009/0021186 A1* | 1/2009 | Kim ............................ 315/294 |
| 2009/0303694 A1 | 12/2009 | Roth et al. |
| 2009/0324732 A1 | 12/2009 | Gnann |
| 2010/0164384 A1 | 7/2010 | Lu et al. |

FOREIGN PATENT DOCUMENTS

| | | |
|---|---|---|
| CN | 201696972 U | 1/2011 |
| JP | 2000294388 A | 10/2000 |
| JP | 2007328954 A | 12/2007 |
| JP | 2010092993 A | 4/2010 |
| WO | 2009090596 A1 | 7/2007 |
| WO | 2007114614 A1 | 10/2007 |
| WO | 2008038179 A2 | 4/2008 |
| WO | 2009150592 A1 | 12/2009 |

* cited by examiner

DYNAMIC LIGHTING SYSTEM WITH A DAILY RHYTHM

FIELD OF THE INVENTION

The invention relates to a method for controlled lighting of an area with a lighting system and to such a lighting system. The invention also relates to a specific use of such a method.

BACKGROUND OF THE INVENTION

Lighting systems that are able to generate light having different colors or different color temperatures are known in the art. US20070153514, for instance, describes methods and systems for illuminating environments, including aircraft environments. The methods and systems include facilities for providing both white and non-white illumination, with color and color temperature control, in programmed response to inputs. Methods and systems are also provided for improving the addressing of light systems in a network lighting configuration. This document especially describes a method comprising (a) controlling at least one light via a lighting control signal to provide illumination including at least one of a white color and a non-white color, the at least one light comprising at least one first LED configured to generate first radiation and at least one second LED configured to generate second radiation different from the first radiation, and (b) generating the lighting control signal based at least in part on data provided by the at least one light, wherein the non-white color or a color temperature of the white color is determined by mixing particular amounts of the first radiation and the second radiation in response to the lighting control signal.

WO2009090596 describes a lighting device comprising one or more light sources arranged to generate light, an accommodating device having an external boundary which is at least partly translucent and which is arranged to accommodate the one or more light sources and a controller. The lighting device can generate two types of light. One or more lighting parameters selected from the group consisting of the first luminous intensity of the first type of light, the second luminous intensity of the second type of light, the color point of the first type of light and the color point of the second type of light can be controlled. This allows task lighting and atmosphere lighting. The invention is also directed to a method of providing a wake-up stimulus by means of such a lighting device.

US2009303694 describes a light emitting device comprising a first light emitting portion that emits white light at a color temperature of 6000K or more and a second light emitting portion that emits white light at a color temperature of 3000K or less, which include light emitting diode chips and phosphors and are independently driven. The light emitting device can be diversely applied in a desired atmosphere and use by realizing white light with different light spectrums and color temperatures. Particularly, an effect on health by adjusting the wavelength of light or the color temperature according to the circadian rhythm of humans is assumed.

SUMMARY OF THE INVENTION

Light coming in the eye and falling upon specific photoreceptors including rods, cones and melanopsin (the "third" receptor) seems to regulate the biological clock in mammals. The biological clock has a daily rhythm which can be influenced by light. The biological clock regulates the sleep-wake rhythm and impacts the well-being of humans. Moreover, color can play an important role in the well-being and the recovery process of a patient.

In color therapy colors are associated with organs. Certain colors are said to stimulate certain organs, which also follow a daily rhythm. Scientific evidence for effects of color therapy is lacking However, many people recognize that the colors of their surroundings have an influence on their emotional state.

The room ambience seems to impact the patient's mood. This can have a positive influence on the recovery process of a patient, when the patient becomes less stressed and more relaxed in a pleasant atmosphere. Colored light programmed within a daily rhythm might be used to activate or unwind hospital patients at different moments of the day.

Furthermore it appears that red light can enhance the sensitivity of an individual to blue light. Red light exposure preceding a darkness period of for instance 40 minutes appears to enhance the sensitivity of the papillary response to a blue light pulse delivered after 40 minutes of darkness. The enhancing effect appears to last for at least 40 minutes in darkness, but is also expected to last throughout the night. The enhancing effect of the red light pulse is believed to occur via photo reversal of the melanopsin photoreceptor, an important mediator for the biological effects of light.

Prior exposure to red light can boost the biological action of a succeeding exposure to blue light. The circadian system appears to be most sensitive to short wavelengths, in the blue part of the spectrum. Red light in the evening can be used to mimic dusk and simultaneously boosts the melanopsin sensitivity to blue light. Red light exposure programmed to occur before falling asleep thus enhances the wake-up supporting action of morning light. A good wake-up makes for a better start of the day, thus contributing to a better patient well-being. Moreover, the use of red light during the night may allow for nocturnal toileting without melatonin suppression. This may keep alertness at lower levels and allows resuming sleep swiftly.

The sleep-inducing nocturnal 'hormone of darkness' melatonin is often used as a marker for the biological clock and the sleep-wake rhythm of an individual. Consolidated sleep is only possible during melatonin secretion. Light at night is known to enhance alertness but also suppresses melatonin secretion. The latter is not favorable for health, as melatonin is known to have radical scavenging properties and seems to be involved in protection against tumor genesis and tumor growth. The ideal night shift lighting for fast rotating shift schedules supports vision and alertness, but does not suppress melatonin levels of (shift) workers. During nighttime, yellow-colored light does not seem to suppress melatonin. Hence, yellow-colored light may be very suitable for night shift lighting, especially in cases where workers' health prevails over their alertness on the job. By providing yellow-colored light instead of white light throughout parts of the night melatonin suppression can be avoided.

White light allows for good vision but does not always result in an attractive atmosphere/ambience. The use of color helps create a more pleasant atmosphere. Moreover, colored light may achieve emotional and biological effects that can contribute to a better quality of life for (hospital) patients and workers alike. However, colored light is not optimal for vision. By providing a lighting system with a daily rhythm where colored light is used during part of the rhythm only, visual issues associated with non-white lighting can be minimized whereas emotional and biological benefits can be maximized.

Normally, high light levels are needed to achieve biological effects of light (like reducing depression and phase shifting circadian rhythms). The use of colored light may help reduce the amount of light needed to achieve a certain biological response, thus reducing energy consumption of the lighting system.

Hence, it is an aspect of the invention to provide an alternative lighting method and an alternative lighting system, which preferably further at least partially obviate one or more of the above-described drawbacks, and which preferably incorporate one or more of the above identified beneficial principles.

The lighting system proposed in this invention may combine a dynamic lighting part with a daily rhythm in intensity and/or color temperature with at least one kind of non-white, colored, light. In an embodiment, during part of the daily rhythm the lighting system uses non-white light without any white general lighting being present.

Hence, in a first aspect, the invention provides a method for controlled lighting of an area with a lighting system, the method comprising providing with the lighting system, according to a predetermined time program, general lighting during a predetermined general lighting period and colored lighting during a predetermined first colored lighting period, wherein the time program runs for at least 6 hours, and wherein in the method a control unit is applied, configured to control the lighting system according to the predetermined time program.

In a further aspect, the invention provides a lighting system comprising (a) a general lighting unit, configured to generate general lighting, (b) a colored lighting unit, configured to generate colored light, and (c) a control unit, configured to control the lighting system according to a predetermined time program, wherein the predetermined time program includes a predetermined general lighting period for providing general lighting and a predetermined first colored lighting period for providing colored lighting, wherein the time program is configured to run for at least 6 hours.

Such a method and lighting system may be able to provide a daily rhythm that uses white light, even of varied intensity and/or varied (correlated) color temperature, and at least one species of non-white light, wherein during a part of the 24 hr rhythm the lighting system uses non-white light, especially without any white being present. The sequential combination of white and colored light may yield specific emotional or health and well-being benefits.

Hence, in a further aspect, the invention also provides the use of the method (and/or lighting system), to promote quality of life, such as well-being, of humans in the area.

Various aspects herein may include:
1) The provision of colored light programmed within a daily rhythm to activate or unwind hospital patients at different moments of the day, as appropriate.
2) The use of colored light to create an ambience in a patient room can make a patient more relaxed and less stressed and may have a positive influence on the patient's recovery process.
3) Melatonin levels of night (shift) workers preferably are not suppressed. This can be achieved by providing a lighting rhythm with, especially, yellow-colored light instead of white light during one or more periods of the night.
4) Red light in the evening can be used to mimic dusk. Red light appears to boost the sensitivity of melanopsin (the main photoreceptor mediating biological effects of light) to blue light. This effect appears to last for at least 40 minutes in the darkness but is also expected to last throughout the night. This way, exposure to red light programmed to occur before a person falls asleep in the evening may enhance the wake-up supporting action of morning light, thus boosting the alerting, and sleep inertia-reducing, action of the morning light exposure. A better wake up makes for a better start of the day, thus improving the perceived well-being and performance.

Hence, in a preferred embodiment, the method further includes providing by means of the lighting system, colored lighting during a predetermined second colored lighting period (of the time program).

The term "controlled" herein especially indicates that the method may be fully automized. For instance, after for instance a once-only input of the predetermined time program, the control unit may control the lighting system permanently. The term "predetermined time program" indicates that the controller controls the lighting of the lighting system according to a predefined scheme or program. As mentioned above, this scheme or program may be imposed on the control unit in a once-only input ("programming"), for instance during the production process of the control unit or lighting system, respectively. It may also be a scheme or program imposed on the control unit by a user. The term "predetermined time program" may in an embodiment also refer to a plurality of predetermined time programs. For instance, dependent upon one or more of the time, week, month, season, year and user input, the specific predetermined time program may (automatically) be selected (by the control unit).

The term "general lighting period" may in an embodiment refer to a plurality of general lighting periods. Likewise, the term "first colored lighting period" may in an embodiment refer to a plurality of first colored lighting periods. For instance, a general lighting period may be preceded and succeeded by first colored lighting periods, respectively. Likewise, the terms "second colored lighting period" and "dark period" may in (independent) embodiments refer to a plurality of second colored lighting periods and dark periods, respectively.

As mentioned above, the time program is configured to run for at least 6 hours. This implies that the controlled lighting is defined for 6 hours or more. This may thus include also one or more dark periods (see also below). Hence, when lighting periods do not overlap, the sum of the general lighting period and first colored lighting period and optional dark period and optional second colored lighting period add up to at least 6 hours. Note however that in an embodiment the general lighting period and one or more of the first colored lighting period and the second colored lighting period may overlap (see also below). During the dark period, no lighting is provided. Hence, the dark period does not overlap with any other period per se.

Said 6 hours may for instance be enough to provide the lighting for a shift or nocturnal lighting. Especially, however, the time program is configured to run for at least 8 hours, as many shifts last 8 hours. The time program may be repeated every 8 hours. In a further specific embodiment, the time program is configured to run for at least 12 hours, i.e. half a day. In yet a further specific embodiment, the time program is configured to run for at least 16 hours, for instance from 06:30 a.m.-22:30 p.m. In yet a further specific embodiment, the time program is configured to run for at least 24 hours, i.e. an entire day. When the time program is configured to run for 24 hours, such a time program may be repeated each day. In a further specific embodiment, the time program is configured to run for at least 5×24 hours. This may for instance be useful in areas where people work in general on 5-days a week basis. However, in a further specific embodiment, the time program is configured to run for at least 5×24+12 hours, or at least 6×24 hours, or even 7×24 hours. Depending upon the area where the invention is applied, the length of the predetermined time program may be chosen. The control unit may be configured to repeat the time program continuously, until it is stopped manually or otherwise. In addition, the predetermined time program may further depend upon the time, week, month, season or year. Hence, the predetermined time program may include a plurality of 24 hour schemes, of which one may be selected based on one or more of the time, week, month, season, year and user input. Hence, the control unit may be configured to select the predetermined time program depending upon for instance time, week, month, season or year. The phrase "configured to run" thus especially indicates that when the method is applied or when the lighting system is used, the time program runs for the indicated time automatically and the control unit controls the lighting system according to this time program for the indicated time, until it is stopped. When not stopped, the control unit may repeat the program over and over.

The phrase "configured to run" especially indicates that when the method is applied, the program runs (lasts) for the indicated time (and defines the types of light and their duration). For instance, when the time program is configured to run for at least 16 hours, this may imply an embodiment of the method for controlled lighting of an area with a lighting system, comprising providing with the lighting system, according to a predetermined time program, general lighting during a predetermined general lighting period and colored lighting during a predetermined first colored lighting period, wherein the time program runs for at least 16 hours, and wherein in the method a control unit is applied, configured to control the lighting system according to the predetermined time program.

The term "area" may be any area. It especially relates to an indoor area, such as a room, a bathroom, a living room, a hall, an office, a working area, etc. Especially, the area may be selected from the group consisting of an office, an indoor plant area, a hospitality area, a hospital area, an elderly home, and a nursing home.

The lighting system, the general lighting unit and the colored lighting unit, may comprise any type of suitable light source, such as one or more selected from the group consisting of high pressure luminescent lamps, low pressure luminescent lamps, incandescent lamps, LEDs, and discharge lamps.

The lighting system may be a single unit, incorporating the function of a general lighting unit and a colored lighting unit. In another embodiment, the lighting system comprises a plurality of lighting units. One or more of the plurality of lighting units may have the general lighting functionality and one or more of the plurality of lighting units may have the colored lighting functionality. In an embodiment, the term "general lighting unit" may refer to a plurality of general lighting units. In yet another embodiment, the term "colored lighting unit" may refer to a plurality of colored lighting units.

The use of the terms "general lighting unit" and "colored lighting unit" does not imply that the general lighting unit may not provide "colored lighting" and/or that the colored lighting may not be used as general lighting. These terms are used to discriminate between the two types of units and two types of lighting.

The term "general lighting" herein especially indicates white light. Further, the term "general lighting" relates to overall illumination of the area. General lighting may radiate a comfortable level of brightness, enabling one to see and walk about safely, especially in the entire area. The term "colored lighting" herein refers to lighting having a non-white color. The term "colored lighting" is further used to distinguish it from general lighting and to indicate that this lighting may have a special function (during the first colored lighting period etc.), for instance to assist general lighting, to replace general lighting, to create specific effects such as to enhance waking up, and/or to enhance quality of life of a human in the area, etc. The colored lighting unit is arranged to provide colored lighting. In an embodiment this is the colored lighting that is generated during the first colored lighting period. In a further embodiment, this is the colored lighting that is provided during the second colored lighting period. In an embodiment one and the same colored lighting unit may be configured to generate different types of colored lighting.

In a specific embodiment (of the method), the lighting system comprises (a) a general lighting unit, configured to generate general lighting, (b) a colored lighting unit, configured to generate colored light, and (c) the control unit. In a specific embodiment, the colored lighting unit comprises one or more wall-washing lamps.

The term "white light" herein, is known to the person skilled in the art. It especially relates to light having a correlated color temperature (CCT) between about 2,000 and 20,000 K, especially 2700-20,000 K, for general lighting especially in the range of about 2700 K and 6500 K, and for backlighting purposes especially in the range of about 7,000 K and 20,000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relate to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The terms "visible" light or "visible emission" refer to light having a wavelength in the range of about 380-750 nm.

In a specific embodiment, the general lighting period (of the time program) and the first colored lighting period (of the time program) do not overlap in time. In such an embodiment, no general lighting is provided when first colored light is provided. Note that the invention may also relate to embodiments wherein one or more first colored lighting periods (of the time program) do not overlap in time with the general lighting period and wherein one or more first colored lighting periods (of the time program) do overlap in time with the general lighting period.

Likewise, in a specific embodiment, the general lighting period (of the time program) and the second colored lighting period (of the time program) do not overlap in time. In such an embodiment, no general lighting is provided when second colored light is provided. Note that the invention may also relate to embodiments wherein one or more second colored lighting periods (of the time program) do not overlap in time with the general lighting period and wherein one or more second colored lighting periods (of the time program) do overlap in time with the general lighting period.

In an embodiment, wherein the predetermined scheme also includes a second colored lighting period, the first colored lighting period and the second colored lighting period may overlap. Note that the invention may also relate to embodiments wherein one or more second colored lighting periods (of the time program) do not overlap in time with the first colored lighting period(s) and wherein one or more second colored lighting periods (of the time program) do overlap in time with the first colored lighting period(s). In yet another embodiment, the first colored lighting period and the second colored lighting period do not overlap. Preferably, the first colored lighting period and the second colored lighting period do not overlap.

As already indicated above, the method may further include providing with the lighting system, according to the predetermined time program, no lighting during a predetermined dark period (of the time program). Hence, the predetermined time program may also include a dark period. The (cumulated) time of the dark period is smaller than the entire time of the predetermined time program.

In a specific embodiment, the predetermined first colored lighting period is applied between 19:00 p.m. and 04:00 a.m. and preferably lasts for a period in the range of 0.25 to 6 h, such as at least 40 minutes. Hence, in an embodiment, the predetermined first colored lighting period is between 19:00 p.m. and 04:00 a.m. The time of the first colored lighting period is preferably in the range of 0.25 to 6 h, such as 0.5 to 2 h. Especially, the colored lighting during the first colored lighting period comprises one or more of green, yellow, and red lighting. For instance, between 21:30 p.m. and 22:30 p.m., a one hour pulse of first colored lighting may be provided, for instance blue lighting.

As already indicated above, the method may further include providing with the lighting system colored lighting during a predetermined second colored lighting period (of the time program). Hence, the predetermined time program may also include a second colored lighting period. Especially, the colored lighting during the second colored lighting period comprises one or more of blue, orange and red lighting. In a further specific embodiment, the predetermined second colored lighting period is applied between 05:00 a.m. and 10:00 a.m. and preferably lasts for a period in the range of 0.25 to 6 h, more preferably 0.25 to 2 h, such as at least 40 minutes. For instance, between 06:30 a.m. and 07:30 a.m., a one hour pulse of second colored lighting may be provided, for instance red lighting.

In a preferred embodiment of the method, the time program runs for at least 24 hours, the predetermined first colored lighting period is applied between 19:00 p.m. and 04:00 a.m., the colored lighting during the first colored lighting period comprises one or more of green, yellow, and red lighting; the method further includes providing with the lighting system colored lighting during a predetermined second colored lighting period (of the time program), wherein the colored lighting during the second colored lighting period comprises one or more of blue, orange and red lighting, and wherein the predetermined second colored lighting period is applied between 05:00 a.m. and 10:00 a.m. Therefore, the invention also provides an embodiment of the lighting system, wherein the time program is configured to run for at least 24 hours, wherein the predetermined first colored lighting period is between 19:00 p.m. and 04:00 p.m., wherein the colored lighting during the first colored lighting period comprises one or more of green, yellow, and red lighting, wherein the time program further includes a predetermined second colored lighting period for providing colored lighting, wherein the colored lighting during the second colored lighting period comprises one or more of blue, orange and red lighting, and wherein the predetermined second colored lighting period is between 05:00 a.m. and 10:00 a.m. Such embodiments may be especially beneficial. For instance, a late red pulse in the evening may enhance the wake up effect of the early blue pulse the next morning. Or, early orange light may enhance activity of a human and late green light may relax a human.

In a specific embodiment, the predetermined time program comprises one or more predetermined general lighting periods and one predetermined first colored period, and optionally one or more additional predetermined first colored periods and optionally one or more predetermined second colored periods, and optionally one or more predetermined dark periods. Optionally, the method may also include providing with the lighting system temporary colored lighting during one or more temporary colored periods, and optionally providing with the lighting system no lighting during one or more dark periods, wherein the control unit is configured to control the lighting system also as function of a sensor signal. For instance, a sensor may sense the presence or movement of a person, and the control unit may then switch from a dark period to a temporary colored lighting period. Likewise, such a sensor may sense the absence of a person, and the control unit may then switch off an additional predetermined first colored period and switch for instance to a dark period, or switch off an optional predetermined second colored period and switch for instance to a dark period. The predetermined time program may further depend upon feedback (sensor signal) from one or more sensors that are configured to sense one or more of activities, behavior or physiological parameters, for instance from video images, facial recognition, IR sensors, heart rate, respiration, speed of typing, temperature, etc. of a human.

In yet a further embodiment, the (correlated) color temperature ($T_c$) of the general lighting may be variable (in time). In such an embodiment, the general lighting unit may be configured to provide general lighting having a variable color temperature. In a specific embodiment, the control unit is further configured to control the color temperature of the general lighting according to one or more of the predetermined time program and a sensor signal. For instance, a sensor may be applied which is configured to sense the daylight intensity in the area, and the control unit may adapt the color temperature of the general lighting accordingly.

In yet a further embodiment, the color of the colored lighting (first colored lighting and optional second colored lighting and optional temporary colored lighting) may be variable (in time). In such an embodiment, the colored lighting unit may be configured to provide colored lighting having a variable color. In a specific embodiment, the control unit is further configured to control the color of the colored lighting according to one or more of the predetermined time program and a sensor signal.

In yet a further embodiment, the intensity of one or more of the general lighting and the colored lighting may be variable (in time). In such an embodiment, the general lighting unit may be configured to provide general lighting having a variable intensity and/or the colored lighting unit may be configured to provide colored lighting having a variable intensity. In a specific embodiment, the control unit is further configured to control the intensity of one or more of the general lighting and the colored lighting according to one or more of the predetermined time program and a sensor signal.

The invention further provides a computer program product comprising data and instructions, said computer program being arranged to be loaded by a control unit of a lighting system, and after being loaded, provide the control unit with the capacity to perform the method according to the invention.

The term "substantially" herein, such as in "substantially all emission" or in "substantially consists", will be understood by the person skilled in the art. The term "substantially" may also include embodiments with "entirely", "completely", "all", etc. Hence, in embodiments the adjective "substantially" may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

BRIEF DESCRIPTION OF THE DRAWINGS

Embodiments of the invention will now be described, by way of example only, with reference to the accompanying schematic drawings in which corresponding reference symbols indicate corresponding periods, and in which:

In FIGS. 1a/1b, on the left y-axis the intensity of the light is indicated (I, in lux) and on the right y-axis the correlated color temperature ($T_c$, in Kelvin) of the general lighting a2 is indicated. In FIGS. 1c/1d, on the x-axis the time (t, in hours) is indicated and on the y-axis the intensity (I, in lux)

DESCRIPTION OF PREFERRED EMBODIMENTS

The use of colored light makes the ambience in a room more pleasant. This has a positive influence on the well-being (mood) and recovery of patients. One could think of offering reddish light in the mornings and evenings, simulating dawn and dusk of a day.

Further, green hospital rooms seem to be stress-reducing, whereas orange rooms are arousal inducing. Hence, colored light programmed within a daily rhythm can be used to activate or unwind hospital patients at different moments of the day. For instance colored light can help patients prepare themselves for examinations, doctor visits or surgery. For some it may be desirable to be put at ease using green light, whereas others may have to be brought to a more alert, less sleepy, state by means of orange light.

Furthermore, red-light exposure appears to enhance the melanopsin-driven (pupil) response during a succeeding blue-light exposure. By using red light during the last part of the evening and the succeeding night, the wake-up, arousal inducing, action of morning white light can be strengthened. This biological response strengthening action of a preceding red light exposure is maintained during a period of darkness. The potentiating action of red light can alternatively be used to prepare for a higher response during that part of the daily rhythm curve in which a higher light level of blueish-white light is offered at the end of mornings. By offering red light before this 'biological morning light', the melanopsin-driven biological response of the blueish-white light is enhanced. This may help reduce the energy needed for biological stimulation.

Yellow-colored light appears to suppress melatonin. Yellow-colored light is very suitable for night shift lighting in cases where workers' health prevails over their alertness on the job, and melatonin levels of (shift) workers should not be suppressed. Throughout parts of the night the daily rhythm automatically provides yellow light instead of white light.

Finally, for cases where colors are directly associated with certain organs, colored light can be used for color therapy purposes to stimulate certain organs and make them more active.

The lighting system of this invention may for instance provide a dynamic daylight rhythm. This rhythm has a cycle of 24 hrs or less, during which the light intensity and optionally also color or color temperature is varied in a pre-programmed way. During part of this rhythm, non-white lighting is offered, optionally without any white light being used for general lighting.

Some examples of execution of the present invention are given below.

Figure 1A:
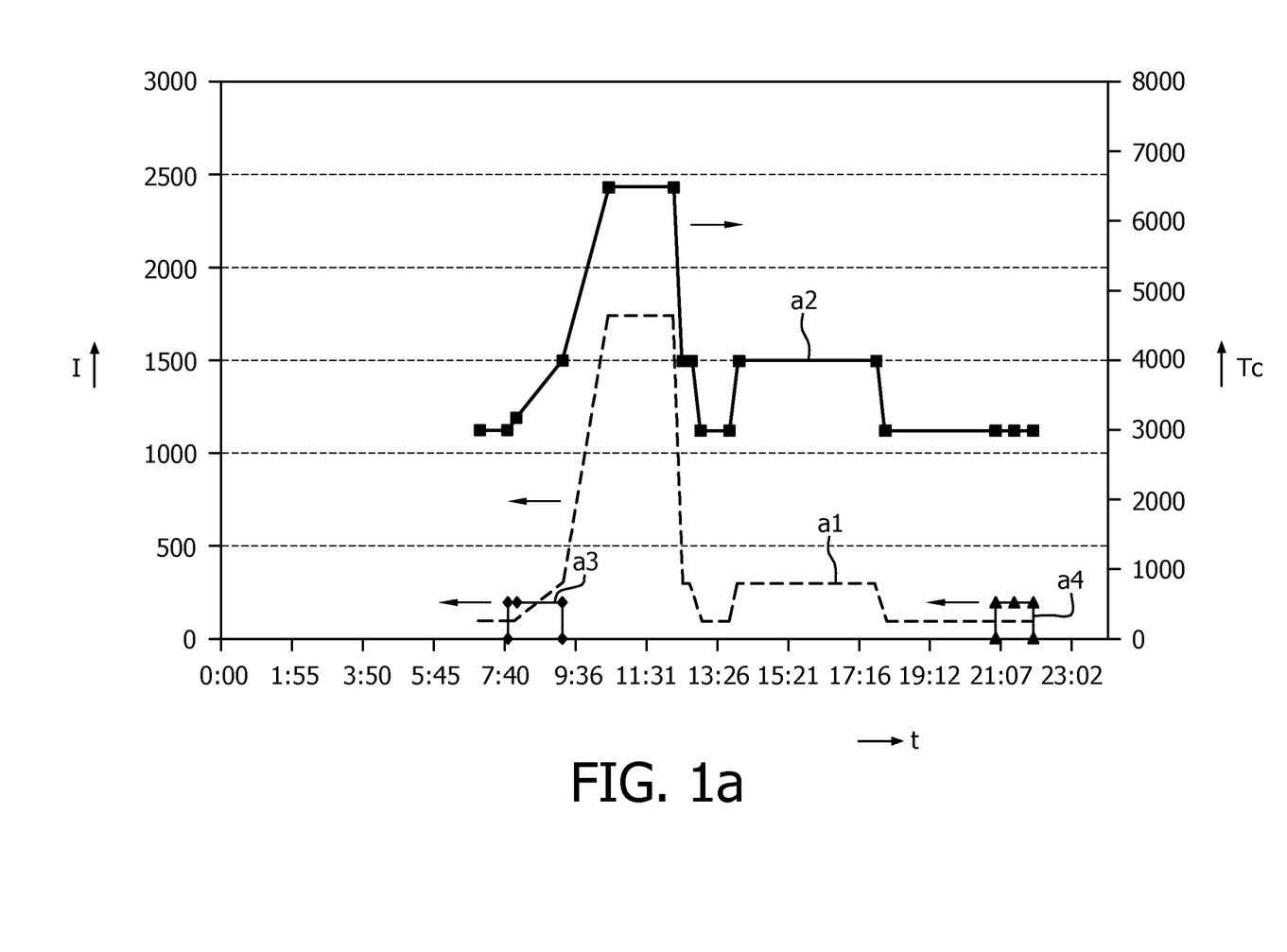
FIGS. 1a-1d schematically depict embodiments of the time program.
Figure 1B:
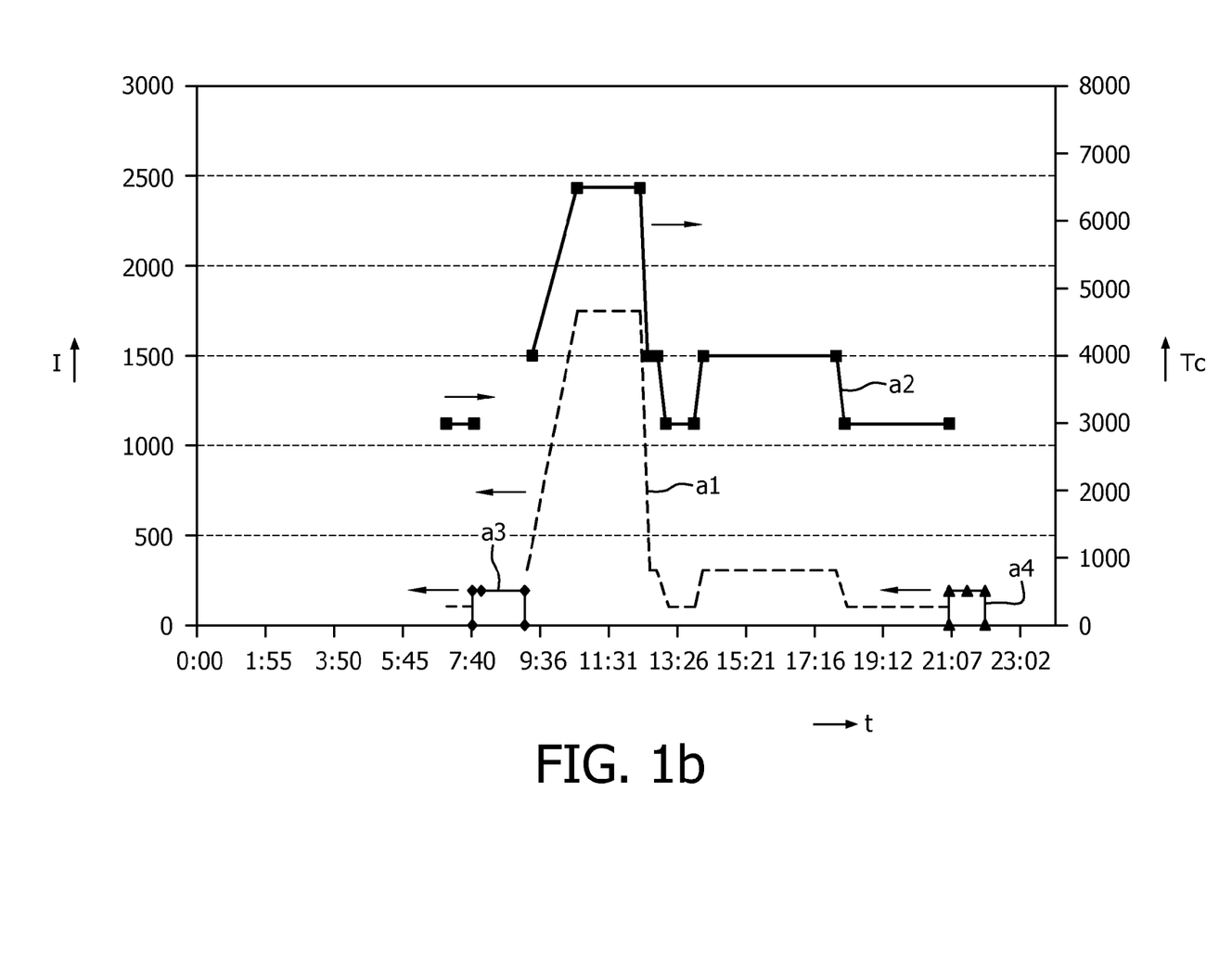

Referring to FIGS. 1a and 1b, during the last part of the evening red (a4) light may be provided. In FIG. 1b, any white light (a1) is switched off when colored light is provided. During the remainder of the night only long-wavelength light is used, if necessary. If appropriate, no light exposure takes place (dark period). The next morning, at the time deemed appropriate for waking up, blue lighting may optionally be switched on (a3). Instead of blue lighting, blue-enriched lighting or white light may be used. The red-light exposure boosts the (alertness inducing) response to the first morning light exposure, thus reducing energy consumption while simultaneously supporting the wake-up process. FIG. 1a schematically depicts the situation where when the first colored lighting (here a4) and the second colored lighting (here a3) are switched on, the general lighting is maintained, whereas in FIG. 1b, the general lighting is switched off.

The curve a2 indicates the color temperature, which may optionally also be varied, for instance to maximize alertness at periods when people tend to lose concentration.

Optionally, the above examples are repeated, except that a long wavelength (>530 nm) orientation light for nocturnal usage is added. This allows people to see without waking them up (i.e. suppressing melatonin) unnecessarily. The orientation light may be switch-operated or can be equipped with motion sensors or camera detection etc. This is an example of temporary colored lighting during one or more temporary colored periods.

Referring to FIGS. 1a-1b, red light might also be used to simulate the last steps from or to darkness during dawn or dusk. The red light need not be a square wave as indicated in FIGS. 1a-1b. It can also be gradually dimmed during dusk and gradually increased in intensity during dawn. Hence, in this example, both curves a3 and a4 refer to lighting periods with red lighting.

Referring to FIGS. 1a-1b, orange lighting may be offered in the morning, for instance to make patients more active, and green light may be offered in the evening to make patients less stressed and more relaxed. Hence, in this example, curve a3 refers to an orange lighting period and curve a4 may refer to a lighting period with green, yellow or red lighting, especially red lighting.

Colored light can for instance be offered by using LED lights or colored fluorescent tube lights.

A lighting system that uses a daily rhythm curve where non-melatonin suppressing long wavelength light is offered during those parts of the night where melatonin secretion is maximal (usually between 01.00-04.00 a.m.) is also possible. During this period, red light of 640 nm is offered, but also yellow light, only containing wavelengths above 530 nm, may be appropriate. During this nocturnal period, no short wavelength light (<530 nm) is present. A regular dynamic lighting scheme precedes and succeeds the blue-deprived nocturnal period, see FIG. 1c.

The example can also be used with non-constant red light in bath- or bedroom, used as an orientation light during the sleep period that does not suppress melatonin and does not wake one up at night when switching on lights to visit the bathroom. From its rhythm the lighting system knows that it is night and automatically uses colored (short wavelength-deprived) light to minimize melatonin suppression, thus minimally disturbing sleep. The nocturnal (orientation) light can be activated based on a motion sensor or the like or by means of a switch.

Figure 1C:
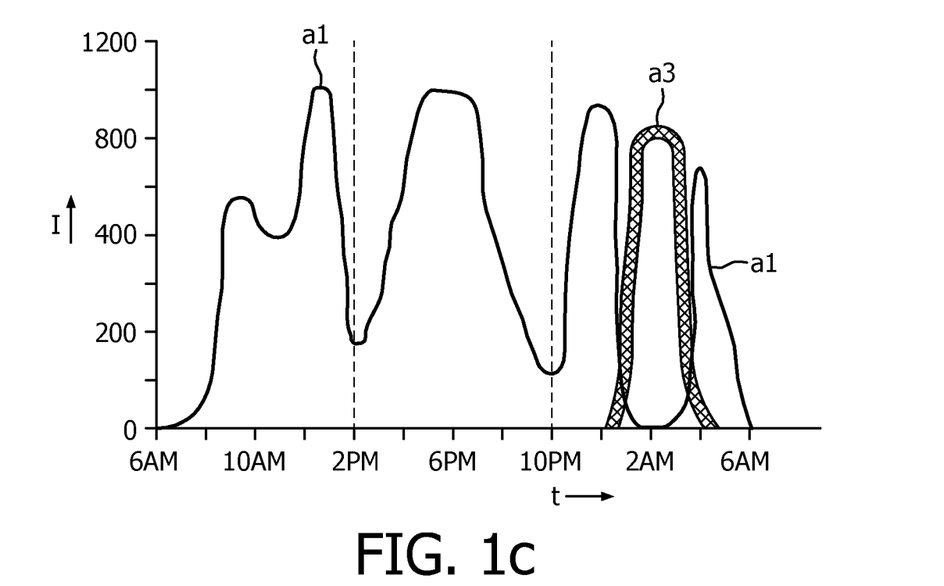

In FIG. 1c, a lighting time program with a 24 hr rhythm involving non-white light to reduce melatonin suppression during night shift light exposure is schematically depicted. It includes yellow or red light between 01.00 a.m.-04.00 a.m. (a3), a dynamic white light profile between 04.00-06.00 a.m. (end of night shift) and a dynamic white light profile from 22.00 p.m.-01.00 a.m. Moreover, a dynamic profile is used during the late shift from 14.00 p.m.-22.00 p.m. and a similar dynamic profile is used for the early shift from 06.00 a.m.-14.00 p.m. (a1). Depending on circadian phase shifting intentions for the circadian rhythm, the dynamic white light profile in either the late evening (22.00 p.m.-01.00 a.m.) or the early morning (04.00 a.m.-06.00 a.m.) can be replaced by yellow or red light.

For fast forward or backward rotating shift schedules it may be advantageous not to make shift workers change their circadian rhythm too much during the light exposure associated with their night shifts. The phase shifting capability of light is usually maximal during a 4-6 hour period centered around the time at which the circadian minimum in the core body temperature (CBT) occurs. Usually the CBT is minimal about 2 hrs before spontaneous wake up, for instance on free days without alarm clock usage. Exposures before the core body temperature minimum delay the circadian rhythm and make people want to stay up later the next day. Light exposures in the morning (after the CBT minimum) advance the circadian rhythm and make people want to get to bed earlier the next night and wake-up earlier the next morning. As short-wavelength light is known to be most effective in achieving phase shifting effects, it may be useful to reduce short wavelength light exposure during the night shift periods during which phase shifting effects are maximal (say 3 hours before or after the CBT minimum), thus reducing the phase shifting action of the nocturnal shift light exposure. For a normally entrained individual the CBT minimum occurs around 04.00 a.m.

Figure 1D:
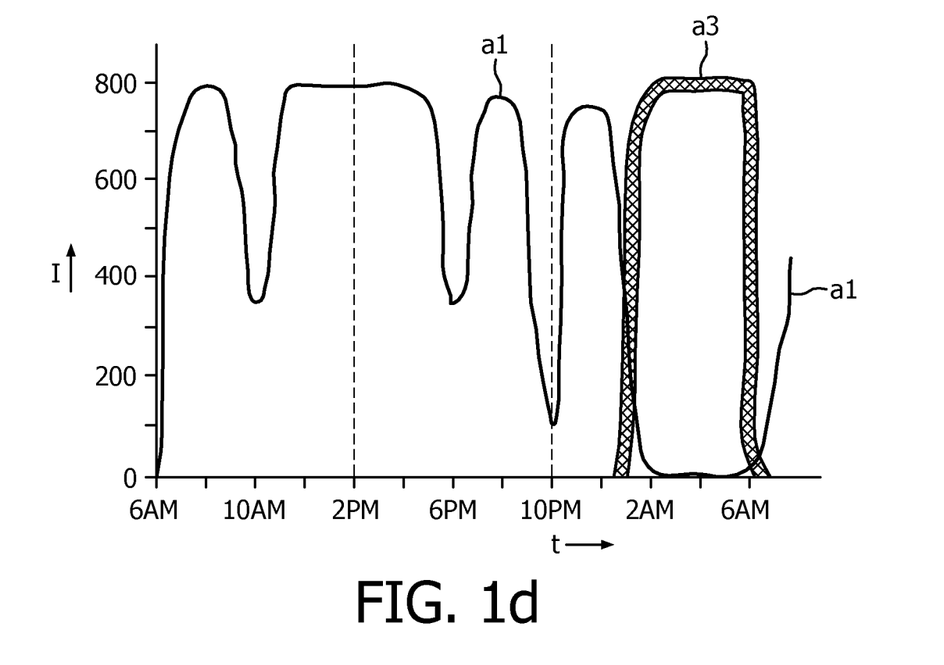

FIG. 1d schematically gives an example of a lighting system with a 24 hr rhythm that tries to avoid phase shifting effects during night shifts by minimizing short wavelength light exposure around the core body temperature (CBT) minimum that occurs around 04.00 a.m. Red or yellow colored light is used during this interval between 01.00-06.00 a.m. (a3), and a dynamic white light profile is used from 22.00 p.m.-01.00 a.m. Moreover, a dynamic profile (white light of varying intensity and/or color temperature) is used during the late shift from 14.00 p.m.-22.00 p.m., and a similar dynamic profile is used for the early shift from 06.00 a.m.-14.00 p.m. (a1).

Colored light may be switched on or off gradually, with some white light being present simultaneously for some time (especially at the transition intervals from white to colored lighting and vice versa) but not all the time.

FIGS. 1c and 1d schematically depict time programs that consist of 3×8 hour subprograms.

Also any combination of the examples is possible. As indicated above, the invention may be applied in lighting systems in patient rooms in hospitals, in lighting in (elderly) care institutions, in hotel lighting systems, in lighting systems for homes, bedrooms and bathrooms, in lighting systems in 24 hr workplace settings, etc.

Figure 2:
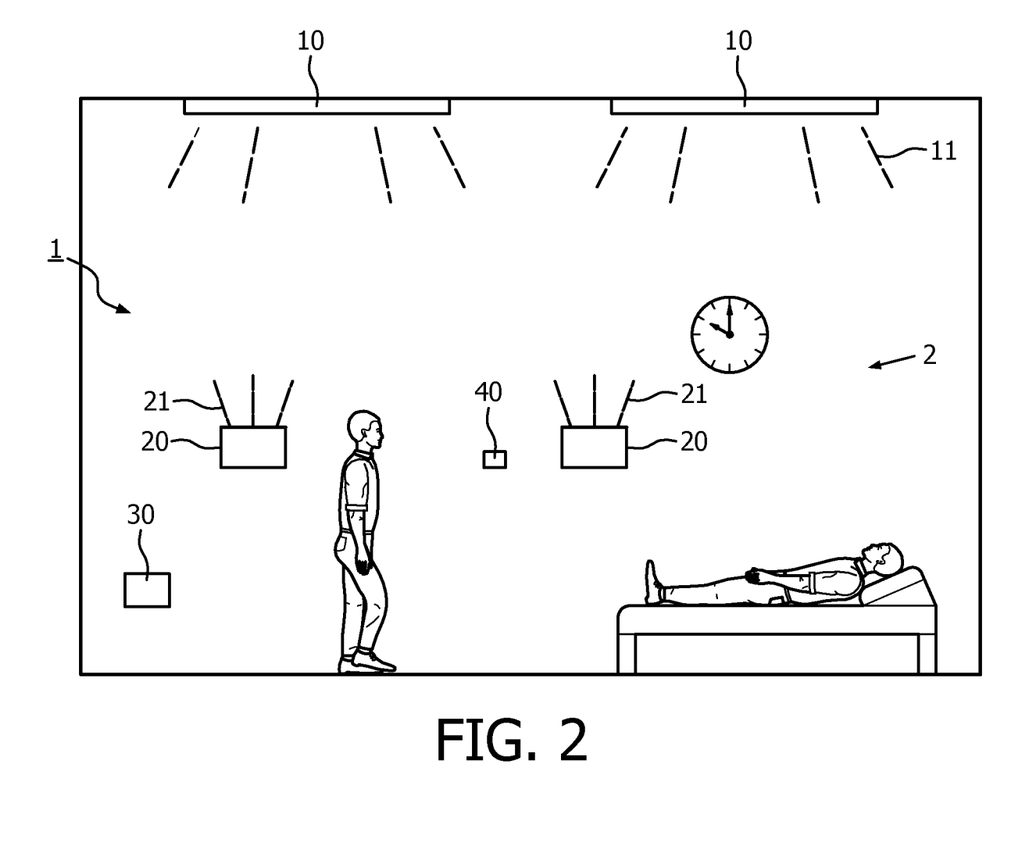
FIG. 2 schematically depicts an embodiment of the lighting system in an area.

FIG. 2 schematically depicts an area 2, wherein a lighting system 1 according to the invention is applied. The lighting system 1 in this embodiment comprises a general lighting unit 10, configured to generate general lighting 11. The lighting system 1 in this embodiment also comprises a colored lighting unit 20 configured to generate colored lighting 21. Further, the lighting system 1 comprises a control unit 30, configured to control the lighting system 1 according to a predetermined time program.

As indicated above, the predetermined time program may include a predetermined general lighting period for providing general lighting 11 and a predetermined first colored lighting period for providing colored lighting 21. The time program is configured to run for at least 6 hours. Some possible schemes are depicted in FIGS. 1a-1d.

Here, the lighting system 1 further comprises a sensor 40, for instance configured to sense the presence and/or movement of a human. The control unit 30 may control the lighting unit(s) in a wired or wireless manner. Likewise, when an optional sensor 40 is part of the lighting system 1, the communication between the optional sensor 40 and the control unit 30 may take place in a wired or wireless manner.

In yet a further aspect, the invention provides a method for controlled lighting of an area with a lighting system, the method comprising providing with the lighting system, according to a predetermined time program, white lighting during a predetermined white lighting period and colored lighting during a predetermined first colored lighting period, wherein the time program runs for at least 6 hours, and wherein in the method a control unit is applied, configured to control the lighting system according to the predetermined time program. Especially, the white lighting period and the first colored lighting period do not overlap in time. Further, the time program is preferably configured to run at least 24 hrs. In a specific embodiment, the white lighting may be lighting from for instance a white halogen uplighter. In yet a further aspect, the invention provides a lighting system comprising (a) a white lighting unit configured to generate white lighting, (b) a colored lighting unit, configured to generate colored lighting, and (c) a control unit configured to control the lighting system according to a predetermined time program, wherein the predetermined time program includes a predetermined white lighting period for providing white lighting and a predetermined first colored lighting period for providing colored lighting, wherein the time program is configured to run for at least 6 hours. Hence, in a specific aspect of the invention, the term "general lighting" herein may be replaced by white lighting In a specific embodiment, the white lighting (period) is (a) general lighting (period).

The invention claimed is:

1. A method for controlled lighting of an area with a lighting system, the method comprising:
   providing a lighting system comprising a general lighting unit configured to illuminate the area with white lighting, a colored lighting unit configured to illuminate the area with colored lighting, a sensor configured to obtain sensor data about the area, and a control unit in communication with the general lighting unit, colored lighting unit, and sensor, wherein the control unit is configured to receive sensor data from the sensor unit, wherein the sensor data includes physiological parameters, and further wherein the control unit is configured to control the lighting system according to a predetermined time program and the obtained sensor data;
   obtaining, by the sensor, sensor data about the area;
   selecting, by the control unit based at least in part on the obtained sensor data, a program time period for which the predetermined time program will run;
   illuminating, according to the predetermined time program and with the general lighting unit of the lighting system, the area with white lighting during a predetermined general lighting period of the selected program time period;
   illuminating, according to the predetermined time program and the obtained sensor data, and with the colored lighting unit of the lighting system, the area with first colored lighting during a predetermined first colored lighting period of the selected program time period; and
   providing, according to the predetermined time program, no lighting from the general lighting unit and no lighting from the colored lighting unit during a predetermined dark period of the program time period.

2. The method according to claim 1, wherein the general lighting period and the first colored period do not overlap in time.

3. The method according to claim 1, wherein the time period is at least 24 hours.

4. The method according to claim 1, wherein the predetermined first colored lighting period is applied between 19:00 p.m. and 04:00 a.m., and lasts for a period in the range of 0.25 to 6 hours.

5. The method according to claim 4, wherein the colored lighting during the first colored lighting period comprises one or more of green lighting, yellow lighting, and red lighting.

6. The method according to claim 1, wherein the method further includes providing with the lighting system second colored lighting during a predetermined second colored lighting period of the program time period, wherein the second colored lighting during the second colored lighting period comprises one or more of blue lighting, orange lighting, and red lighting.

7. The method according to claim 6, wherein the predetermined second colored lighting period is applied between 05:00 a.m. and 10:00 a.m. and lasts for a period in the range of 0.25 to 6 hours.

8. A computer program product comprising data and instructions, said computer program being arranged to be loaded by a control unit of capacity to perform the method according to claim 1.

9. The method of claim 1, wherein the first colored lighting consists of one selected from the group consisting of green lighting and orange lighting.

10. The method of claim 9, wherein the second colored lighting consists of blue lighting.

11. The method of claim 1, further comprising:
    illuminating, with the colored lighting unit of the lighting system, the area with first colored lighting having a first color during the first color lighting period; and
    illuminating, with the colored lighting unit of the lighting system, the area with second colored lighting having a second color different from the first color during a second lighting period.

12. The method of claim 1, wherein the first colored lighting consists of blue lighting.

13. A lighting system comprising:
    (a) a general lighting unit, configured to generate white lighting,
    (b) a colored lighting unit, configured to generate colored lighting,
    (c) a sensor, configured to obtain sensor data about an area to be illuminated by the general and colored lighting units, wherein the sensor data includes physiological parameters; and
    (d) a control unit, configured to receive the sensor data and further configured to control the general lighting unit and the colored lighting unit according to a predetermined time program having a program time period for which the predetermined time program runs, wherein the program time period includes a predetermined general lighting period during which the control unit controls the general lighting unit to illuminate the area with white lighting, a predetermined first colored lighting period during which the control unit controls colored lighting unit to illuminate the area with first colored lighting based at least in part on the obtained sensor data, and wherein the control unit is further configured to select the program time period for which the predetermined time program runs based at least in part on the obtained sensor data.

14. The lighting system according to claim 13, wherein the time program is configured to run for at least 24 hours, wherein the predetermined first colored lighting period is between 19:00 p.m. and 04:00 a.m.;
wherein the first colored lighting generated by the colored lighting unit during the first colored lighting period comprises one or more of green lighting, yellow lighting, and red lighting;
wherein the time program further includes a predetermined second colored lighting period for providing second colored lighting;
wherein the second colored lighting generated by the colored lighting unit during the second colored lighting period comprises one or more of blue lighting, orange lighting, and red lighting; and
wherein the predetermined second colored lighting period is between 05:00 a.m. and 10:00 a.m.

15. The lighting system of claim 14, wherein the second colored lighting consists of blue lighting.

16. The lighting system of claim 13, wherein the control unit is further configured to control the lighting system to provide no lighting from the general lighting unit and no lighting from the colored lighting unit during a predetermined dark period of the program time period.

17. A method, comprising:
selecting, by a control unit of a lighting system, a program time period for which a predetermined time program will run based at least in part on sensor data obtained about an area from a sensor in communication with the control unit, wherein the sensor data includes physiological parameters;
running the predetermined time program for the selected program time period, including the steps of:
illuminating the area with white light provided from a general lighting unit of the lighting system during a predetermined general lighting period of the selected program time period, and
illuminating the area with first colored lighting provided from a colored lighting unit of the lighting system during a predetermined colored lighting period of the selected program time period based at least in part on the obtained sensor data; and
automatically repeating the running of the predetermined time program.

18. The method of claim 17, wherein running the predetermined time program for the program time period includes providing no lighting from the general lighting unit and no lighting from the colored lighting unit during a predetermined dark period of the program time period.

19. The method of claim 17, further comprising varying an intensity of the white light provided from the general lighting unit during the predetermined general lighting period, according to a dynamic rhythm.

20. The method of claim 17, further comprising varying a color temperature of the white light provided from the general lighting unit during the predetermined general lighting period, according to a dynamic rhythm.

* * * * *